Dec. 27, 1949 J. E. HEARRON 2,492,573
TOOL CARRIER FOR TRACTORS
Filed Dec. 30, 1947 2 Sheets-Sheet 2

Inventor
John E. Hearron

By *Clarence A. O'Brien and Harvey B. Jackson*
Attorneys

Patented Dec. 27, 1949

2,492,573

UNITED STATES PATENT OFFICE 2,492,573

TOOL CARRIER FOR TRACTORS

John E. Hearron, Tule Lake, Calif.

Application December 30, 1947, Serial No. 794,507

1 Claim. (Cl. 97—47)

This invention relates to new and useful improvements and structural refinements in tool carriers for tractors, and the principal object of the invention is to provide a device of the character herein described which will facilitate the pulling of various types of agricultural implements by tractors, or the like, in such manner as to provide a firm, even and a steady draw on the implement being pulled.

A further object of the invention is to provide a tool carrier which, by virtue of its operation as above outlined, will eliminate vibration such as is usually encountered in the use of carriers of conventional type, and also, which will prevent the implement or tool from leaving the ground under the pulling effort of the tractor, particularly when obstacles in the ground are encountered.

An additional object of the invention is to provide a tool carrier which is simple in construction, efficient in operation, and which may be readily applied to various types of tractors or other sources of motive power.

Another object of the invention is to provide a tool bar which may be conveniently employed with various types of agricultural implements or tools, which implements or tools may be readily applied to or removed from the carrier, as required.

A still further object of the invention is to provide a tool carrier which will readily lend itself to economical manufacture, which will not easily become damaged, and which is otherwise well adapted for the purpose for which it is intended.

Figure 1:
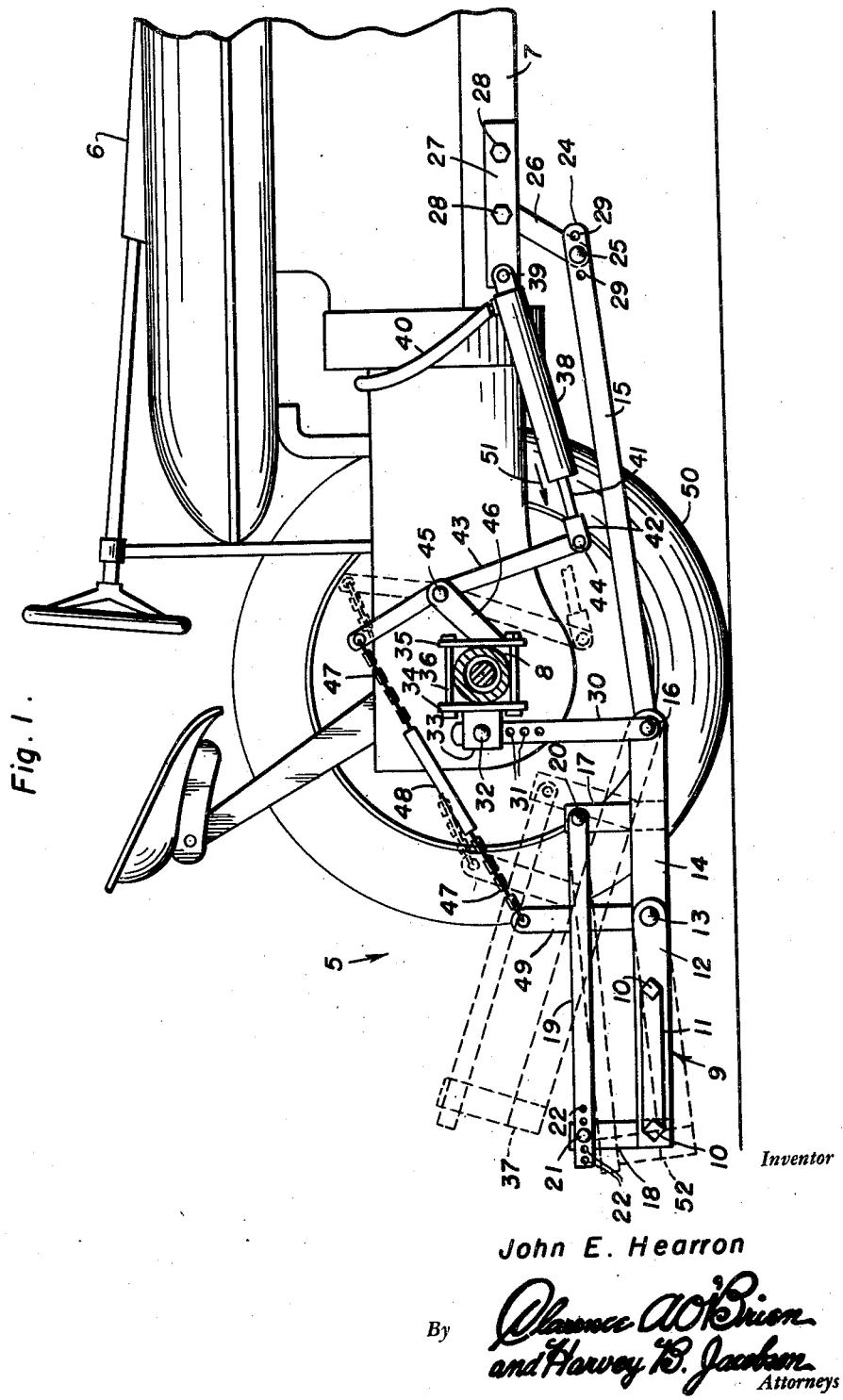
Figure 2:
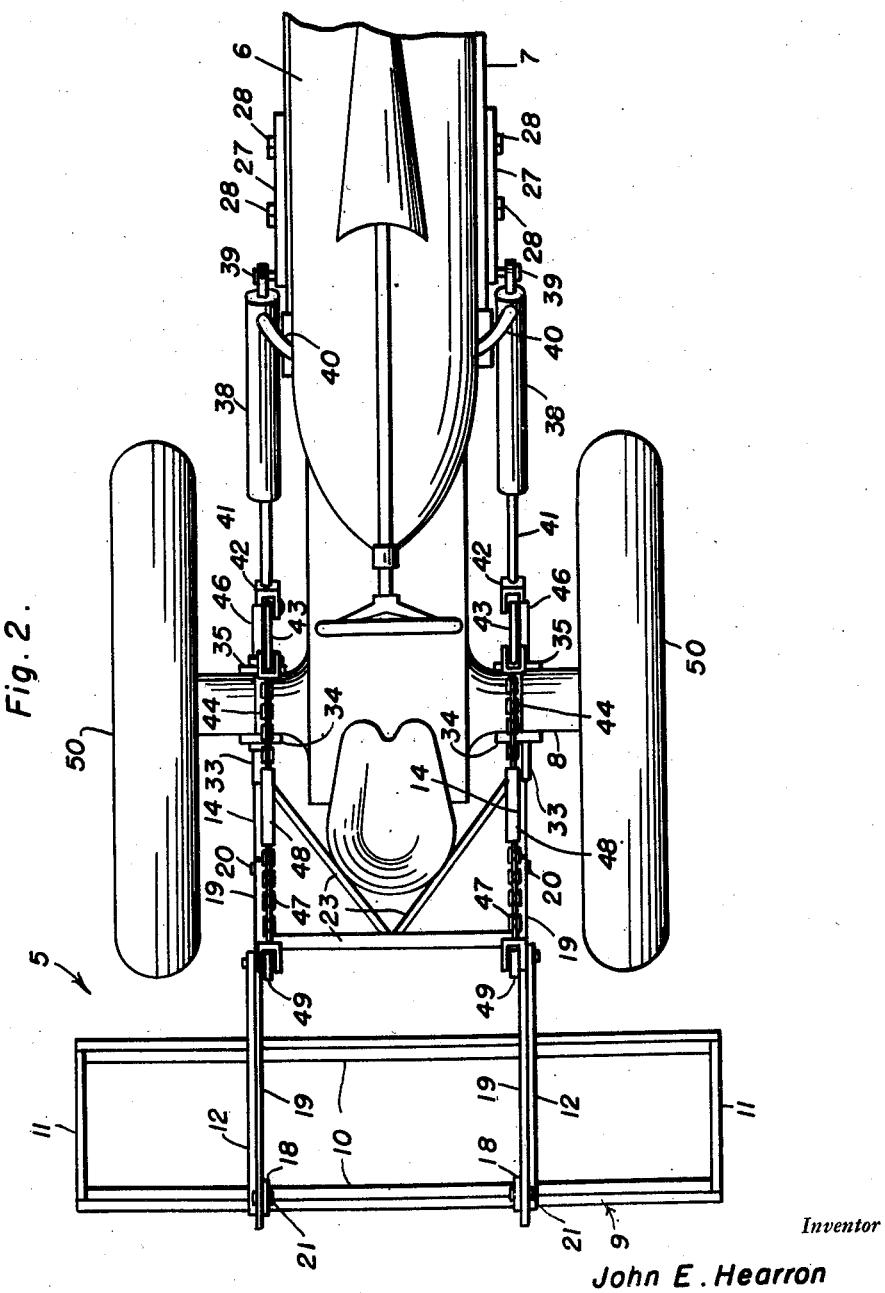

With the above more important objects in view, and such other objects as may become apparent as this specification proceeds, the invention consists essentially of the arrangement and construction of parts as illustrated in the accompanying drawings, in which:

Figure 1 is a side elevation of the invention, showing the same in association with a tractor, and Figure 2 is a top plan view of the subject shown in Figure 1.

Like characters of reference are employed to designate like parts in the specification and throughout the several views.

Referring now to the accompanying drawings in detail, the invention consists of a tool carrier designated generally by the reference character 5, the same being adapted for use in association with a conventional tractor 6, including the usual frame 7 and a rear axle housing 8.

The invention embodies in its construction a carrier unit designated generally by the reference character 9, this consisting of a plurality of horizontally disposed spaced parallel tool holding rods 10 of a polygonal cross-sectional configuration which are mounted in a manner to be more fully hereinafter described, transversely behind the tractor 6, as will be clearly apparent.

The rods 10 are secured together at the ends thereof by means of a pair of cross-members 11, and a pair of intermediate members 12 are also provided on the rods. The members 12 are pivoted as at 13 to a pair of straps 14, the latter being pivotally secured in a substantially horizontal position to a pair of drawbars 15, as shown at 16.

A pair of upstanding brackets 17 are secured to the straps 14, while a pair of further brackets 18 are rigidly mounted on one of the rods 10. Connecting links 19 are connected as at 20, 21 to the brackets 17, 18 respectively, the pivots 21 being adjustable by virtue of apertures 22 formed in the rear end portions of the links 19.

If desired, the straps 14 may be reinforced by means of suitable braces 23. The aforementioned bars 15 extend longitudinally under the tractor frame 7 and have their forward end portions 24 rigidly yet adjustably secured, as at 25, to convenient brackets 26 rigidly mounted on the frame 7. In effect, the brackets 26 may be secured to the frame 7 by means of straps 27 which are attached to the frame as at 28.

The forward end portions of the drawbars 15 may be equipped with a plurality of apertures 29, whereby adjustment of the drawbars with respect to the brackets 26 will be facilitated.

A pair of substantially upright struts 30 are pivoted to the aforementioned connections 16, the struts 30 extending upwardly and being provided in the upper end portions thereof with rows of apertures 31, whereby they may be adjustably secured as at 32 to lugs 33 which, in turn, are mounted or rigidly secured to clamping plates 34. These plates coact with further clamping plates 35, to which they are attached by means of the clamping bolts 36, the plates 34, 35 being rigidly mounted upon the side portions of the aforementioned rear axle housing 8, as will be clearly apparent from the accompanying drawings.

It will be apparent that the entire carrier unit 9 may be raised to a position substantially as indicated by the phantom lines 37, so that the tool carrier may clear the ground while being transported from one site of operation to another. This raising or lowering of the carrier unit is accomplished by means of power actuated units, such as for example, by a pair of hydraulic or pneumatic cylinders 38 which are attached to the frame 7 by means of the aforementioned strips or straps 27 as at 39, and receive their hydraulic or pneumatic supply through the medium of suitable conduits or hoses 40.

The cylinders 38 include reciprocable rods 41, the outer end portions of which are connected by means of the forks 42 to the end portions of a pair of cranks 43, the connection of the forks 42 to the cranks 43 being illustrated at 44. The cranks 43 are pivoted medially of their lengths as at 45 to a pair of brackets 46 secured to the aforementioned clamping plates 35, and the remaining ends of the cranks are operatively connected to the carrier unit 9 by means of flexible elements, such as for example, by lengths of chain 47. For purposes of adjustment, these lengths of chain are interrupted, so to speak, and suitable turnbuckles 48 are interposed into their lengths, as will be clearly apparent. The chains 47 are attached to a pair of cranks 49, which are rigidly connected to the straps 14.

As will be observed from the accompanying Figure 1, when the carrier 9 is in its lowered position, the various tools (not shown) such as may be mounted upon the rods 10 will be caused by the weight of the carrier to embed themselves into the ground and, at the same time, will urge the wheels 50 of the tractor 6 to the ground, so that efficient tractive effort will be obtained and the possibility of the tools or implements leaving the ground will be minimized.

On the other hand, the carrier unit 9 including the various tools which may be attached thereto, may be easily and conveniently lifted from the ground by simply actuating the cylinders 38, in which event movement of the piston rods 41 in the direction of the arrows 51 will raise the carrier unit to the elevated position (as indicated at 37), so that the tools will clear the ground while the carrier is being transported.

The depth of engagement of the tools on the carrier with the ground may be varied as desired, by simply moving the connecting pins 21 to the various apertures 22, so that the rear end portion of the carrier may be lowered or raised about the pivots 13, as indicated at 52.

It is believed that the advantages and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention what is claimed as new is:

In a tool carrying attachment for tractors, the combination of a pair of transversely spaced straps pivotally connected at their forward ends to a tractor and adapted for swinging movement in vertical planes, upstanding brackets rigidly secured to intermediate portions of said straps, a pair of longitudinal members having forward ends pivoted to rear ends of the straps and constituting continuations of the latter, transverse tool carrying bars mounted on said members, additional upstanding brackets rigidly secured to rear ends of said members, a pair of transversely spaced links pivoted at their forward ends to the brackets on said straps and provided in their rear end portions with rows of apertures, and fastening elements provided on the brackets on said members and receivable selectively in said apertures, whereby said members and said straps may be supported in a predetermined relation.

JOHN E. HEARRON.

REFERENCES CITED

The following references are of record in the file of this patent:

UNITED STATES PATENTS

| Number | Name | Date |
|---|---|---|
| 1,694,252 | Doepke | Dec. 4, 1928 |
| 2,048,914 | Altgelt et al. | July 28, 1936 |
| 2,140,144 | Silver | Dec. 13, 1938 |
| 2,167,210 | Imsick | July 25, 1939 |
| 2,174,808 | Tuft | Oct. 3, 1939 |